US012665097B2

(12) United States Patent  
Bischoff et al.

(10) Patent No.: US 12,665,097 B2  
(45) Date of Patent: Jun. 23, 2026

(54) NUCLEAR FUEL ROD AND MANUFACTURING METHOD

(71) Applicant: FRAMATOME, Courbevoie (FR)

(72) Inventors: Jérémy Bischoff, Lyons (FR); Dominique Duthoo, Romans-sur-Isère (FR)

(73) Assignee: FRAMATOME, Courbevoie (FR)

( * ) Notice: Subject to any disclaimer, the term of this patent is extended or adjusted under 35 U.S.C. 154(b) by 473 days.

(21) Appl. No.: 18/031,609

(22) PCT Filed: Oct. 11, 2021

(86) PCT No.: PCT/EP2021/078038  
§ 371 (c)(1),  
(2) Date: Apr. 12, 2023

(87) PCT Pub. No.: WO2022/078951  
PCT Pub. Date: Apr. 21, 2022

(65) Prior Publication Data  
US 2023/0386689 A1 Nov. 30, 2023

(30) Foreign Application Priority Data

Oct. 13, 2020 (FR) ..................................... 20 10437

(51) Int. Cl.  
| G21C 3/10 | (2006.01) |
| G21C 3/07 | (2006.01) |
| G21C 21/02 | (2006.01) |
| B23K 11/16 | (2006.01) |

(52) U.S. Cl.  
CPC ................. G21C 3/10 (2013.01); G21C 3/07 (2013.01); G21C 21/02 (2013.01); B23K 11/163 (2013.01)

(58) Field of Classification Search  
CPC . G21C 3/10; G21C 3/07; G21C 21/02; B23K 11/163  
USPC ................................. 376/414, 421, 451, 457  
See application file for complete search history.

(56) References Cited

U.S. PATENT DOCUMENTS

| 5,401,933 A | 3/1995 | Yoneda |
| 9,721,676 B2 | 8/2017 | Mazzoccoli et al. |
| 2013/0272484 A1 | 10/2013 | Lee et al. |
| 2017/0330638 A1 | 11/2017 | Ishibashi et al. |
| 2018/0366234 A1 | 12/2018 | Hertz et al. |
| 2019/0139654 A1 | 5/2019 | Lahoda et al. |

(Continued)

FOREIGN PATENT DOCUMENTS

| EP | 0524332 A1 | 1/1993 |
| EP | 0845146 A1 | 6/1998 |

(Continued)

OTHER PUBLICATIONS

International Search Report for PCT/EP2021/078038.  
French Search Report for FR2010437.

*Primary Examiner* — Jack W Keith  
*Assistant Examiner* — Daniel Wasil  
(74) *Attorney, Agent, or Firm* — Davidson Kappel LLC

(57) ABSTRACT

A nuclear fuel rod comprises nuclear fuel contained in a cladding, the cladding comprising a tube and two plugs, the tube extending along a central axis and having two ends, each plug being attached to a corresponding end of the tube by sealing the end of the tube. The tube is covered by a tube coating extending over the entire length of the tube from one end of the tube to the other.

16 Claims, 3 Drawing Sheets

(56)        References Cited

U.S. PATENT DOCUMENTS

2020/0118696 A1 *  4/2020  Pomirleanu .............. G21C 3/10
2020/0273684 A1 *  8/2020  Jurczyk .................. G21C 21/02

FOREIGN PATENT DOCUMENTS

JP          H0831666  A       11/1996
JP          H1031086  A   *    2/1998
JP          H1058160  A       3/1998
WO        WO9748104  A1     12/1997
WO        WO2013087869  A1     6/2013

* cited by examiner

NUCLEAR FUEL ROD AND MANUFACTURING METHOD

The present disclosure relates to the field of nuclear fuel rods, in particular for a light water reactor.

BACKGROUND

Nuclear fuel assemblies used in light water reactors generally comprise a bundle of nuclear fuel rods, each nuclear fuel rod comprising a cladding containing nuclear fuel, the cladding consisting of a cladding tube closed by a plug at each of the two ends thereof.

Each plug is e.g. welded to the corresponding end of the tube so as to close the tube in a sealed manner. Different welding techniques can be used for attaching each plug to the tube, e.g. TIG welding (inert atmosphere arc welding with tungsten electrode), laser welding or electron beam welding.

The tube and the plugs are generally made of metal. Same are made e.g. of zirconium or of zirconium alloy, e.g. a zirconium alloy of the Zircaloy type.

In order to protect the cladding from the particularly aggressive environment wherein same is located during the operation of the nuclear reactor, it is possible to provide the tube with an external protective coating, e.g. a protective coating made of chromium or chromium alloy.

The presence of a protective coating on the tube is likely to have a negative effect on the weld made between the tube and a plug. The resulting weld could be weakened and/or sensitive to corrosion.

In order to limit such risk, the protective coating is deposited over most of the length of the tube, without coating the end portions of the tube whereto the plugs are welded. Thus, the protective coating does not pollute the weld made between the tube and each plug.

SUMMARY

However, portions of the tube which are not covered with a protective coating form zones of weakness of the tube and of the rod, as same could be more sensitive to heavy wear or corrosion, including high temperature oxidation in accidental conditions.

One of the aims of the present disclosure is to propose a nuclear fuel rod which is easy to manufacture while being resistant, in particular, to corrosion and oxidation at high temperature.

To this end, the present disclosure proposes a nuclear fuel rod comprising nuclear fuel contained in a cladding, the cladding comprising a tube and two plugs, the tube extending along a central axis and having two ends, each plug being attached to a corresponding end of the tube by sealing said end, the tube being covered by a tube coating, wherein the tube coating extends over the entire length of the tube from one end of the tube to the other.

According to particular embodiments, the nuclear fuel rod element comprises one or a plurality of the following optional features, taken individually or in all technically possible combinations:

one of the plugs or each plug is covered at least partially by a plug coating;

the plug coating of each plug being provided with a plug coating and the tube coating are distinct;

the tube coating and the plug coating are made of the same material;

the plug coating of each plug with a plug coating and the tube coating are contiguous at the interface between the tube and the plug;

wherein each plug, whether coated or not, is welded onto the tube without affecting the shape of the interface between the tube and the plug and/or without reworking the interface between the tube and the plug, in particular by a mechanical or chemical process involving removal of material;

the tube is made of a zirconium based material;

each plug is made of a zirconium based material;

the tube coating is made of a chromium based material;

each plug is attached onto the tube without the presence of a eutectic at the junction between the tube and the plug between the tube material, the tube coating material, the plug material and, where appropriate, the plug coating material covering the plug.

The present disclosure further relates to a manufacturing method for a nuclear fuel rod as defined above, comprising the production of the tube and of the plugs, each plug being coated, if appropriate, with a plug coating, and the welding by electric resistance welding of at least one of the plugs or of each plug to the corresponding end of the tube.

According to particular embodiments, the manufacturing process comprises one or a plurality of the following optional features, taken individually or in all technically possible combinations:

each plug is welded to the tube by electric resistance butt welding;

the electric resistance welding of at least one of the plugs or of each plug is carried out with a current comprised between 10 kA and 20 kA;

the electric resistance welding of at least one of the plugs or of each plug is carried out by applying the plug against the corresponding end of the tube under a pressing force comprised between 200 daN and 400 daN, preferentially between 250 daN and 350 daN;

electric resistance welding of at least one of the plugs or of each plug is carried out by applying an electric current for a length of time comprised between 10 ms and 30 ms;

the manufacturing process is carried out without reworking the interface between the tube and each plug welded to the tube by a mechanical or chemical process involving removal of material;

each plug is welded onto the tube without the formation of a eutectic at the junction between the tube and the plug between the tube material, the tube coating material, the plug material and, where appropriate, the plug coating material covering the plug.

BRIEF SUMMARY OF THE DRAWINGS

The present disclosure and the advantages of the present disclosure will be better understood upon reading the following description, given only as a non-limiting example, and made with reference to the enclosed drawings, wherein.

DETAILED DESCRIPTION

Figure 1:
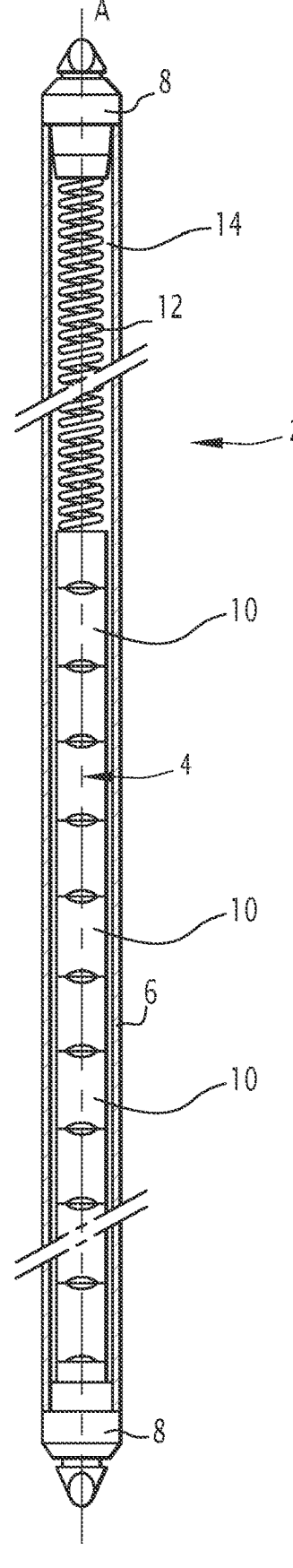
FIG. 1 is a schematic view in longitudinal section of a nuclear fuel rod.

FIG. 1 shows a nuclear fuel rod 2 intended e.g. for being used in a light water reactor, in particular a pressurized water reactor (PWR) or a boiling water reactor (BWR), a "WER" reactor, a "RBMK" reactor, or a heavy water reactor, e.g. a "CANDU" reactor.

The nuclear fuel rod 2 has the shape of a rod elongated along a central axis A.

The nuclear fuel rod 2 comprises a cladding 4 containing nuclear fuel.

The cladding 4 comprises a tube 6 and two plugs 8, each plug 8 being welded to a corresponding end of the tube 6 so as to close the end in a sealed manner. The tube 6 extends along the central axis A of the nuclear fuel rod 2. The tube 6 preferentially has a circular cross-section centered on the central axis A.

The nuclear fuel is e.g. in the form of a stack of pellets 10 stacked axially inside the tube 6, each pellet 10 containing fissile material. The stack of pellets 10 is also called a "fissile column".

The nuclear fuel rod 2 comprises, as an option, a spring 12 arranged inside the tube 6, between the stack of pellets 10 and one of the plugs 8, for pushing the stack of pellets 10 toward the other plug 8. The spring 12 is compressed between the stack of pellets 10 and the plug 8.

There is a space or plenum 14 between the stack of pellets 10 and the plug 8 onto which the spring 12 presses. The plenum 14 can be used for the storage of gas released from the nuclear fuel during the operation of the reactor. The spring 12 is located inside the plenum 14.

Figure 2:
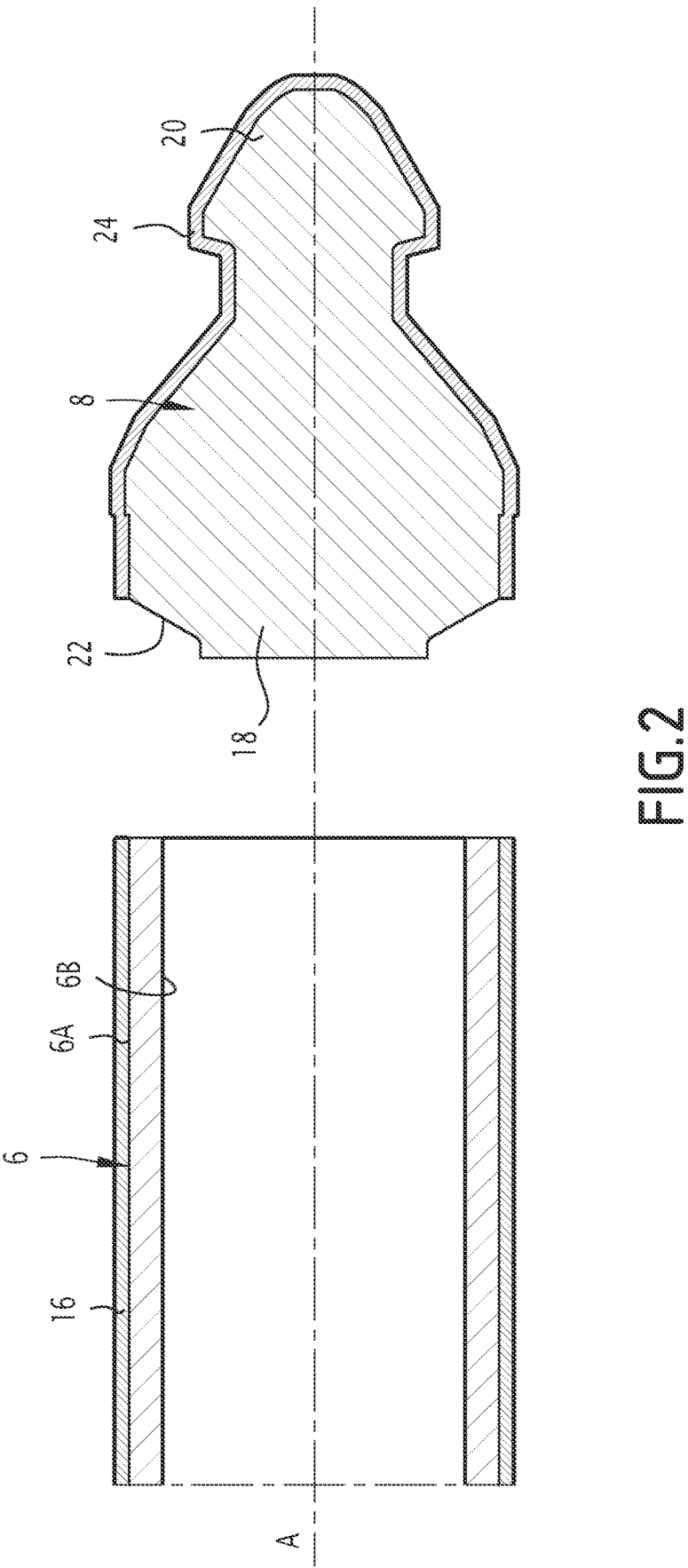
FIGS. 2 and 3 are sectional views illustrating a manufacturing method for a nuclear fuel rod such as same shown in FIG. 1.
Figure 3:
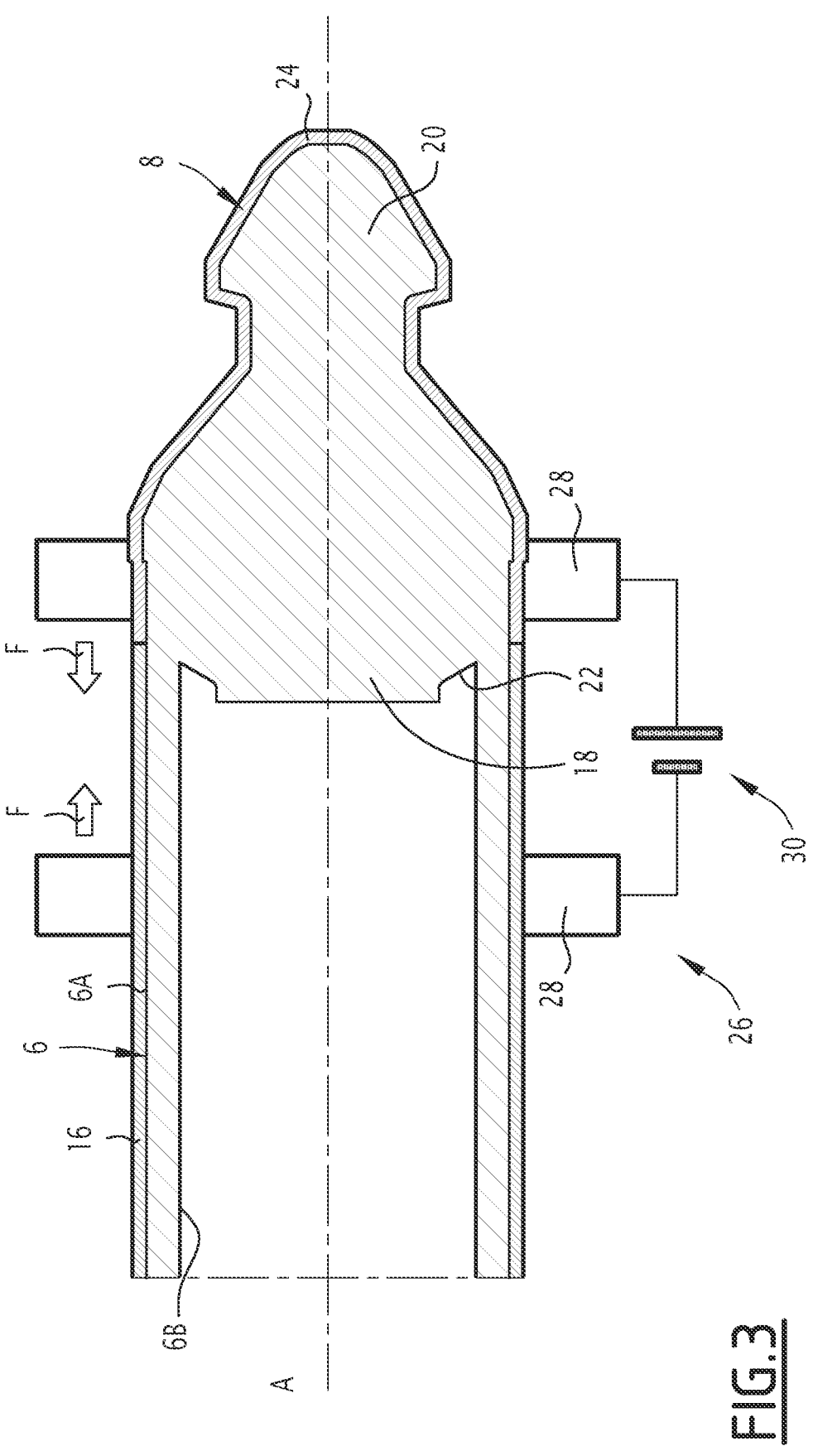

As shown in FIGS. 2 and 3 which illustrate the welding of a plug 8 to one end of the tube 6, the tube 6 is provided with a tube coating 16.

The tube 6 has an inner surface 6B oriented toward the inside of the tube 6 and an outer surface 6A oriented toward the outside of the tube 6.

The tube coating 16 covers the outer surface 6A of the tube 6 so as to protect the tube from the outer environment. In operation, the tube coating 16 is in contact with the environment.

The tube 6 is e.g. made of a zirconium based material.

In the present context, a zirconium based material refers to a material made of pure zirconium or a zirconium based alloy. A pure zirconium material is a material comprising at least 99% by weight of zirconium.

An zirconium based alloy is an alloy comprising at least 95% by weight of zirconium.

In one example of embodiment, the zirconium based material of the tube 6 is a quaternary zirconium alloy the composition of which comprises, from 0.8 to 1.8% by weight of niobium, from 0.2 to 0.6% by weight of tin and from 0.02 to 0.4% by weight of iron, the rest consisting of zirconium and inevitable impurities The tube 6 has e.g. a thickness comprised between 0.4 mm and 1 mm. The thickness of the tube 6 is the distance between the inner surface 6B and the outer surface 6A of the tube 6.

The tube coating 16 is thin and has e.g. a thickness strictly less than the thickness of the tube 6.

The tube coating 16 has e.g. a thickness comprised between 5 μm and 25 μm, in particular a thickness comprised between 10 μm and 20 μm. The thickness of the tube coating 16 is taken perpendicular to the outer surface 6A of the tube 6, i.e. radially with respect to the central axis A of the tube 6.

The tube coating 16 is made of a chromium based material.

In the present context, a chromium based material refers to a pure chromium material or an chromium based alloy.

A pure chromium material is a material comprising at least 99% by weight of chromium. A chromium based alloy is an alloy comprising at least 85% by weight of chromium.

In one embodiment, the chromium based material is a chromium based alloy chosen from: a binary chromium-aluminum alloy, a binary chromium-nitrogen alloy, and a binary chromium-titanium alloy.

The tube coating 16 comprises a single layer made of a chromium based material or a plurality of overlaid layers made of a chromium based material, preferentially of the same chromium based material.

The structure of the tube coating 16 in a plurality of overlaid layers results e.g. from the deposition process used for depositing the tube coating 16 onto the tube 6, in particular if the deposition is carried out in a plurality of passes.

The tube coating 16 extends over the entire length of the tube 6 from one end of the tube 6 to the other.

In a preferred embodiment, the tube coating 16 is continuous. Same completely covers the outer surface 6A of the tube 6.

Each plug 8 comprises an insertion part 18 inserted into the tube 6 for attaching the plug 8 to the corresponding end of the tube 6, and an exposed part 20 remaining outside the tube 6 once the plug 8 has been attached to the corresponding end of the tube 6.

Each plug 8 has an annular surface 22 which presses against the end of the tube 6 when the plug 8 is arranged at the end of the tube 6. The annular surface 22 is centered on the central axis A. The annular surface 22 is located at the junction between the insertion part 18 and the exposed part 20. As shown in FIG. 2, the annular surface 22 is e.g. frustoconical, widening from the insertion part 18 toward the exposed part 20.

Each plug 8 is e.g. made of a zirconium based material.

In one example of embodiment, the zirconium based material of the plug 8 is a quaternary zirconium alloy the composition of which comprises, from 0.8 to 1.8% by weight of niobium, from 0.2 to 0.6% by weight of tin and from 0.02 to 0.4% by weight of iron, the rest consisting of zirconium and inevitable impurities.

In one example of embodiment, the tube 6 and each plug 8 are made of the same material.

As an option, each plug 8 of the nuclear fuel rod 2 is provided with a plug coating 24. The plug coating 24 extends over the exposed part 20 of the plug 8.

In a preferred embodiment, the plug coating 24 is continuous. Same e.g. completely covers the exposed part 20.

The plug coating 24 preferentially extends to the outer edge of the annular surface 22.

The plug coating 24 is made e.g. of a chromium based material.

In one example of embodiment, the chromium based material of the plug coating 24 is an chromium based alloy chosen from: a binary chromium-aluminum alloy, a binary chromium-nitrogen alloy and a binary chromium-titanium alloy.

The plug coating 24 of each plug 8 provided with a plug coating 24 is distinct from the tube coating 16.

In one example of embodiment, the tube coating 16 and the plug coating 24 of each plug 8 are made of the same material.

When a plug 8 is provided with a plug coating 24, the latter is provided so that the tube coating 16 and the plug coating 24 are contiguous when the plug 8 is arranged at the end of the tube 6.

More particularly, the plug coating 24 extends over the exposed portion 20 so as to be contiguous with the tube coating 16 when the plug 8 is arranged at the end of the tube 6.

The insertion part 18 and, where appropriate, the annular surface 22 have no plug coating 24. The plug coating 24 does not cover the insertion part 18 and, where appropriate, the annular surface 22.

Preferentially, each plug 8 is attached, and in particular welded, onto the tube 6 without the presence of a eutectic at the junction between the tube 6 and the plug 8, between the material of the tube 6, the material of the tube coating 16, the material of the plug 8 and, where appropriate, the material of a plug coating 24 covering the plug 8.

In particular, when the tube 6 and/or the plug 8 is/are made of a zirconium based material and the tube coating 16 and/or a possible plug coating 24 is/are made of a chromium based material, the nuclear fuel rod 2 has no chromium-zirconium eutectic (Cr—Zr) at the junction between the tube 6 and the plug 8.

The presence of a eutectic at the junction between the tube 6 and the plug 8, in particular, a chromium-zirconium eutectic (Cr—Zr), would be likely to weaken the nuclear fuel rod 2 and reduce the resistance thereof to oxidation, in particular at high temperature (typically above 350° C.).

As shown in FIGS. 2 and 3, a manufacturing method for the nuclear fuel rod 2 comprises providing the tube 6 coated with the tube coating 16 thereof and a plug 8 coated, if appropriate, with a plug coating 24 (FIG. 2), then the attachment of the plug 8 to one end of the tube 6, the attachment being carried out by electric resistance welding or "resistance butt welding" (FIG. 3).

For the attachment of the plug 8 onto the tube 6 by resistance welding, the plug 8 is positioned at the end of the tube 6, and an electric current is applied between the tube 6 and the plug 8 so as to weld the plug 8 to the tube 6. During the flow of the electric current, the tube 6 and the plug 8 heated by the Joule effect so that the surfaces thereof which are in contact, weld together under the combined effect of a welding force and of heating.

More particularly in the present case, the plug 8 is arranged at the end of the tube 6 so that the annular surface 22 thereof presses axially against the end of the tube 6, and the electric current is then applied (see FIG. 3).

The electric resistance welding is carried out without adding material.

Preferentially, the attachment is carried out by electric resistance butt welding, also known under the name of "Resistance Butt Welding"

For the attachment of each plug 8 to the tube 6 by electric resistance welding, the plug 8 is positioned at the end of the tube 6, the plug 8 and the tube 6 being applied against each other with a determined pressing force (Arrows F in FIG. 3), an electric current being applied between the tube 6 and the plug 8 while maintaining the pressing force, so as to weld the plug 8 to the tube 6.

More particularly in the present case, the plug 8 is arranged at the end of the tube 6 so that the annular surface 22 presses axially against the end of the tube 6 under the determined pressurization force, the latter being maintained during the application of the electric current (see FIG. 3).

As shown in FIG. 3, the electric resistance welding is carried out, e.g. using a welding machine 26 comprising gripping members 28, one provided for gripping a plug 8 and the other for gripping the tube 6 near the end of the tube 6 whereto said plug 8 is attached, the gripping members 28 being provided for pressing the tube 6 and the plug 8 against each other, preferentially, under a determined pressing force, the welding machine 26 comprising an electric supply 30 for applying the current between the tube 6 and the plug 8 via the gripping members 28.

The electric resistance welding is performed by applying a direct current, an alternating current or a pulsed current. Preferentially, the resistance welding is carried out by applying an alternating current. The use of direct current or pulsed current (obtained e.g. by discharge from capacitors) can be equally envisaged.

Preferentially, the electric resistance welding of each plug 8 is carried out by applying an electric current with a value comprised between 10 kA and 20 kA.

Preferentially, the electric resistance welding of each plug 8 is carried out under a pressing force comprised between 200 daN and 400 daN, preferentially between 250 daN and 350 daN.

Preferentially, the electric resistance welding of each plug 8 is carried out by applying an electric current for a length of time comprised between 10 ms and 30 ms Preferentially, the electric resistance welding of each plug 8 is carried out in such a way that the temperature of the tube 6 and of the plug 8 at the interface thereof is comprised between 1300° C. and 1600° C.

Advantageously, the welding by electric resistance is carried out in such a way that, at the end of the welding, the tube 6 and the plug 8 have a weld bead of which dimensional characteristics are under control and checked.

In other words, at the end of the welding, the tube 6 and the plug 8 have a shape compatible with the structural elements of the fuel assembly.

Such a situation is achieved by controlling e.g. the type of current applied (direct current, alternating current or pulsed current), the amperage of the current, the duration of application of the current and the pressing force used to press the tube 6 and the plug 8 against each other, and, if appropriate, maintained during the application of the electric current as well as the nature and geometry of the gripping members 28.

The ranges of values as indicated above, particularly when taken in combination, allow the desired temperature range to be maintained and hence electric resistance welding to be achieved.

Controlling the dimensions of the weld bead along the weld seam avoids having to carry out an operation of reworking the weld seam, in particular by a mechanical or chemical process involving removal of material, e.g. by deburring and polishing, and makes it possible to preserve the tube coating 16 and, where appropriate, the plug coating 24.

Thus, it is possible to obtain a rod, tube 6 of which is provided with a tube coating 16 over the entire length of the tube 6, from one end of the tube 6 to the other. Where appropriate, when each plug 8 is provided with a plug coating 8, the cladding 4 as a whole (i.e. the tube 6 and each plug 8) is thus coated and efficiently protected from the external environment.

In particular, the plug coating 24 of each plug 8 provided with a plug coating 24 and the tube coating 16 are contiguous at the interface between the tube 6 and the plug 8.

In an example of embodiment wherein the tube coating 16 and the plug coating 24 are continuous, and after welding, the plug coating 24 and the tube coating 16 together form a continuous coating, extending continuously over the tube 6 and the plug 8, in particular, at the interface between the tube 6 and the plug 8.

When the tube coating 16 is continuous and each plug 8 is provided with a continuous plug coating 24, the tube coating 16 and the plug coatings 24 form a cladding coating continuously covering the cladding 4, extending over the entire length of the tube 6 and over the plugs 8, with coating continuity at the interface between the tube 6 and each plug 8.

Each plug 8 provided with a plug coating 24 is welded onto the tube 6 without affecting the shape of the interface between the tube 6 and the plug 8 and/or without reworking the interface between the tube 6 and the plug 8, in particular, by a mechanical or chemical process involving removal of material.

Furthermore, the manufacturing method can be used for attaching each plug 8 to the tube 6 without forming a eutectic at the junction between the tube 6 and the plug 8, between the material of the tube 6, the material of the tube coating 16, the material of the plug 8 and, where appropriate, the material of a plug coating 24 covering the plug 8.

In particular, when the tube 6 and/or the plug 8 is/are made of a zirconium based material and the tube coating 16 and/or a possible plug coating 24 is/are made of a chromium based material, the nuclear fuel rod 2 has no chromium-zirconium eutectic (Cr—Zr) at the junction between the tube 6 and the plug 8. Preferentially, the two plugs 8 are attached onto the tube 6 as indicated hereinabove, so as to form the nuclear fuel rod 2.

The attachments of the plugs 8, the insertion of the nuclear fuel, herein in the form of pellets 10, and, if appropriate, the insertion of the spring 12, are carried out sequentially.

E.g. one of the plugs 8 is attached onto the tube 6, then the nuclear fuel and, if appropriate, the spring 12 are inserted into the tube 6, then the other plug 8 is attached to the tube 6.

Preferentially, the plug 8 which is attached first is the plug 8 situated on the side opposite the spring 12. Afterward, the nuclear fuel and then the spring 12 are inserted into the tube 6, then the other plug 8 is attached to the tube 6.

As an option, additional elements are inserted into the tube 6. An additional element which can be inserted into the tube 6 is a tubular shim intended for being located between the column of pellets 10 and the plug 8 situated at the end of the tube 6 opposite the end where the spring 12 is located. In particular, the shim makes it possible to form a second plenum at the end of the rod opposite the spring 12.

In operation, the nuclear fuel rod 2 inserted into a nuclear fuel assembly is oriented substantially vertically inside the core of the nuclear reactor.

One of the plugs 8, called the upper plug 8, is intended to be located at the top, the other amongst the plugs 8, called the lower plug 8, being intended for being located at the bottom.

The upper plug 8 is the plug which is adjacent to the spring 12. When a tubular shim is provided, the shim is adjacent to the lower plug 8.

As can be seen in FIG. 1, one or each of the plugs 8 advantageously comprises a gripping member 32 intended for being apt to grab the nuclear fuel rod, e.g. to extract same from the nuclear fuel assembly. In FIG. 1, each of the plugs 8 has such a gripping member 32.

Thus, preferentially, the manufacturing method comprises first the attachment of the lower plug 8 to one end of the tube 6, then the insertion of the nuclear fuel and of the spring 12 inside the tube 6, then the attachment of the upper plug 8 onto the other end of the tube.

During the manufacturing process, the tube 6 is provided with the tube coating 16 before the attachment of each plug 8 onto the tube 6, and each plug 8 provided with a plug coating 24 being provided with the plug coating 24 before the attachment thereof onto the tube 6.

Although each plug 8 is then welded onto the tube 6, it is possible to obtain a continuous coating of the tube 6 and of each plug 8 coated with a plug coating 24, the tube coating 16 and the plug coating 24 being contiguous.

The manufacturing process comprises the production of the tube 6, e.g. by a pilgering process.

The manufacturing method comprises the deposition of the tube coating 16 onto the tube 6, and, where appropriate, the deposition of a plug coating 24 onto each plug 8 provided with such a coating 8.

The deposition of the tube coating 16 and/or each plug coating 24 is carried out e.g. by physical vapor deposition, in particular by physical vapor deposition by cathode sputtering, even more particularly by magnetron sputtering. In this way, a resistant tube coating 16 is obtained.

The physical vapor deposition by magnetron sputtering of the tube coating 16 and/or of each plug coating 24 can be carried out e.g. according to one of the following techniques or a combination of at least two of the following techniques: direct current (DC) magnetron sputtering, pulsed direct current (or DC pulsed) magnetron sputtering, High Power Impulse Magnetron Sputtering (HiPIMS or HPPMS), Magnetron Sputtering Bi-polar (MSB), Dual Magnetron Sputtering (DMS), Unbalanced Magnetron Sputtering (UBM).

The nuclear fuel rod 2 is not limited to the embodiment indicated above.

In the embodiment shown in FIGS. 1 to 3, each plug 8 is provided with a plug coating 24 covering the exposed part 20 of the plug 8.

In a variant, neither of the two plugs 8 is provided with a plug coating 24 or only one of the two plugs 8 is provided with a plug coating 24. In the latter case, either the lower plug 8 or the upper plug 8 is concerned. The lower plug 8 and the upper plug 8 are not subject to exactly the same thermal, chemical and neutron stresses, so that it could be advantageous to coat only one of the two plugs 8.

When at least one of the plugs 8 has no coating (or is "uncoated"), each uncoated plug 8 is attached to the tube 6, and in particular welded onto the tube 6, without affecting the shape of the interface between the tube 6 and the plug 8 and/or without reworking the interface between the tube 6 and the plug 8, in particular by a mechanical or chemical process involving removal of material.

In the embodiment of FIGS. 1 to 3, the nuclear fuel is provided in the form of a stack of pellets 10 containing fissile material.

In a variant, the nuclear fuel is provided in another form, e.g. in powder form.

What is claimed is:

1. Nuclear fuel rod comprising nuclear fuel, a cladding, and end plugs, the cladding comprising a tube extending along a central axis and having two ends, the tube being covered by a tube coating, wherein the tube coating extends over the entire length of the tube from one end of the tube to the other end, each end plug being fixed to a respective end of the tube, sealing the respective end in a leak-tight manner, at least one end plug of the end plugs being welded to a respective end of the tube without affecting the shape of an interface between the tube and the at least one end plug, the at least one end plug being at least partially covered by an end plug coating prior to the welding, the end plug coating and the tube coating are made of the same material, and the end plug coating and the tube coating are contiguous at an interface between the end plug coating and the tube coating.

2. The nuclear fuel rod according to claim 1, wherein the tube is made of a zirconium based material.

3. The nuclear fuel rod according to claim 1, wherein each plug is made of a zirconium based material.

4. The nuclear fuel rod according to claim 1, wherein the tube coating is made of a chromium based material.

5. The nuclear fuel rod according to claim 1, wherein the at least one end plug is welded to the respective end of the tube without reworking the interface by a mechanical or chemical process with material removal.

6. The nuclear fuel rod according to claim 1, wherein each end cap plug being fixed to the tube without the presence of an eutectic at a junction between the tube and the end plug, or between the tube coating and the end plug coating.

7. The nuclear fuel rod according to claim 1, wherein the end plug coating is made of a chromium based material.

8. Assembly comprising a nuclear fuel rod cladding tube and an end plug, the cladding tube is configured to contain nuclear fuel therein, the cladding tube extending along a central axis and having a first end and a second end, the cladding tube comprising an outer surface extending over the entire length of the cladding tube between the ends, wherein the outer surface is covered by a tube coating, a weld arrangement fixing the end plug to an end of the cladding tube, sealing the end in a leak-tight manner, the end plug being fixed to the end of the cladding tube without affecting the shape of an interface between the cladding tube and the end plug, an outer surface of the end plug is at least partially covered by an end plug coating prior to the end plug being fixed to the cladding tube, the end plug coating and the tube coating are contiguous at an interface between the end plug coating and the tube coating, and the end plug coating and the tube coating are made of the same material.

9. A method of manufacturing a nuclear fuel rod, the nuclear fuel rod comprising nuclear fuel, a cladding, and end plugs, the cladding comprising a tube extending along a central axis and having two ends, the tube being covered by a tube coating, wherein the tube coating extends over the entire length of the tube from one end of the tube to the other end, each end plug being fixed to a respective end of the tube, sealing the respective end in a leak-tight manner, at least one end plug of the end plugs being welded to a respective end of the tube without affecting the shape of an interface between the tube and the at least one end plug, the at least one end plug being at least partially covered by an end plug coating prior to the welding, the end plug coating and the tube coating are made of the same material, and the end plug coating and the tube coating are contiguous at an interface between the end plug coating and the tube coating;

the method comprising:

producing the tube and the end plugs, with each end plug being coated with the end plug coating; and welding by electric resistance welding the at least one end plug to the respective end of the tube.

10. The method according to claim 9, wherein each end plug is welded onto the tube by electric resistance butt welding.

11. The method according to claim 9, wherein the electric resistance welding of the at least one end plug is carried out with a current comprised between 10 kA and 20 kA.

12. The method according to claim 9, wherein the welding by electric resistance of the at least one end plug is carried out while applying the at least one end plug against the respective end of the tube under a pressing force between 200 daN and 400 daN.

13. The method according to claim 9, wherein the welding by electric resistance of the at least one end plug is carried out while applying the at least one end plug against the respective end of the tube under a pressing force between 250 daN and 350 daN.

14. The method according to claim 9, wherein the electric resistance welding of the at least one end plug is carried out by applying an electric current for a length of time between 10 ms and 30 ms.

15. The method according to claim 9, wherein the welding is carried out without reworking the interface between the tube and the at least one end plug by a mechanical or chemical process involving removal of material.

16. The method according to claim 9, wherein the welding includes welding each end plug onto the tube, without forming an eutectic at a junction between the tube and each end plug.

\* \* \* \* \*